(12) United States Patent
Bunting et al.

(10) Patent No.: US 8,647,447 B2
(45) Date of Patent: Feb. 11, 2014

(54) FILTER FLOSSER

(76) Inventors: Michael David Bunting, Gilbert, AZ (US); Denise Marie Bunting, Gilbert, AZ (US)

( * ) Notice: Subject to any disclaimer, the term of this patent is extended or adjusted under 35 U.S.C. 154(b) by 1168 days.

(21) Appl. No.: 12/536,797

(22) Filed: Aug. 6, 2009

(65) Prior Publication Data
US 2010/0037926 A1 Feb. 18, 2010

Related U.S. Application Data

(60) Provisional application No. 61/088,787, filed on Aug. 14, 2008.

(51) Int. Cl.
B08B 3/02 (2006.01)
(52) U.S. Cl.
USPC ......... 134/166 R; 134/152; 134/199; 134/900
(58) Field of Classification Search
USPC ...................... 134/138, 152, 166 R, 199, 900; 239/530, 546
See application file for complete search history.

(56) References Cited

U.S. PATENT DOCUMENTS

| 391,347 | A | 10/1888 | Valentine | |
|---|---|---|---|---|
| 2,985,178 | A | 5/1961 | Christensen | |
| 3,428,060 | A | 2/1969 | Spivey | |
| 3,526,237 | A | 9/1970 | Neill, Jr. | |
| 3,606,897 | A | 9/1971 | Tobin, III | |
| 3,650,283 | A | 3/1972 | Lang | |
| 3,765,051 | A | 10/1973 | Wanat | |
| 3,820,552 | A | 6/1974 | Lang et al. | |
| 4,299,245 | A | 11/1981 | Clapper | |
| 4,417,596 | A | 11/1983 | Pahlen | |
| 4,509,545 | A * | 4/1985 | Trotter | 134/199 |
| 4,655,910 | A | 4/1987 | Tabor | |
| 4,668,384 | A | 5/1987 | Holman | |
| 4,709,717 | A * | 12/1987 | Rannigan et al. | 134/199 |
| 4,836,702 | A * | 6/1989 | Allen | 401/10 |
| 5,263,503 | A | 11/1993 | St. Jean | |
| 5,292,074 | A * | 3/1994 | Clark et al. | 239/546 |
| 5,297,739 | A * | 3/1994 | Allen | 239/530 |
| 5,330,065 | A | 7/1994 | Bradley | |
| 5,384,045 | A | 1/1995 | Chimielewski et al. | |
| 5,989,419 | A | 11/1999 | Dudley | |
| 6,463,943 | B1 | 10/2002 | Monroe | |
| 6,715,501 | B2 | 4/2004 | Pociask | |
| 2002/0166578 | A1 * | 11/2002 | Leblond | 134/99.2 |

* cited by examiner

*Primary Examiner* — Michael Barr
*Assistant Examiner* — Benjamin L Osterhout

(57) ABSTRACT

Filter Flosser is a tool designed for cleaning cartridge filters that are used in pools, spas and industrial filtration systems. There is an ergonomically designed handle with an on/off ball valve switch to turn water flow on or off. There is a nozzle portion that is curved to wrap partially around the shape of a cartridge filter. There are holes in the nozzle portion which are evenly spaced that spray water into the cartridge filter elements to get between the pleats and remove dirt deposits.

15 Claims, 6 Drawing Sheets

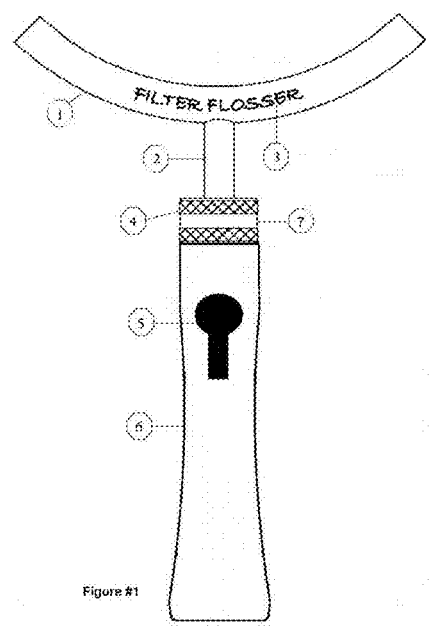

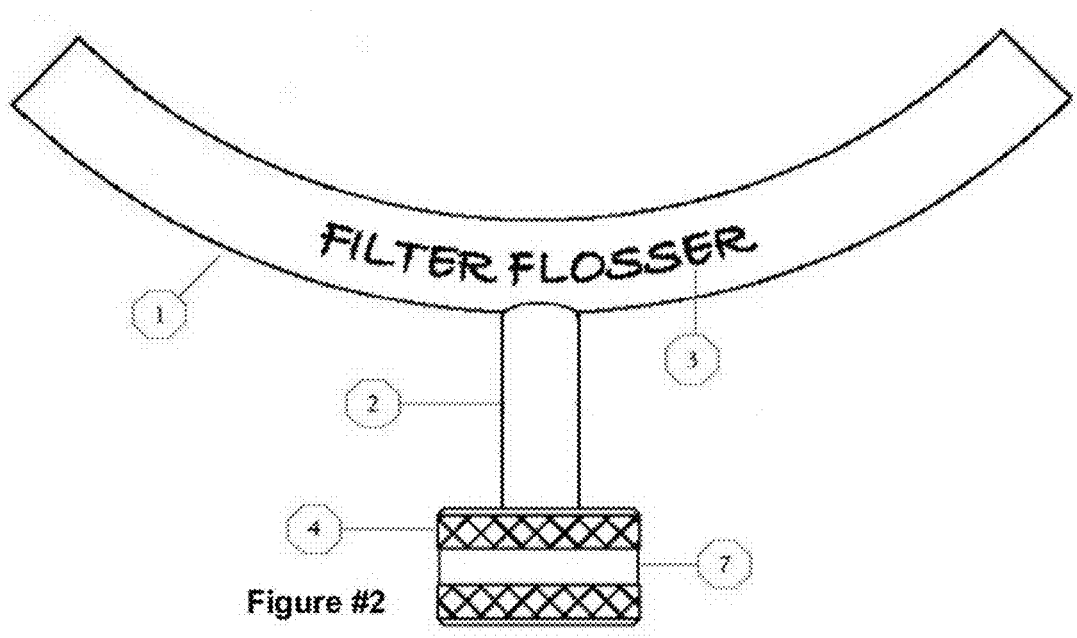

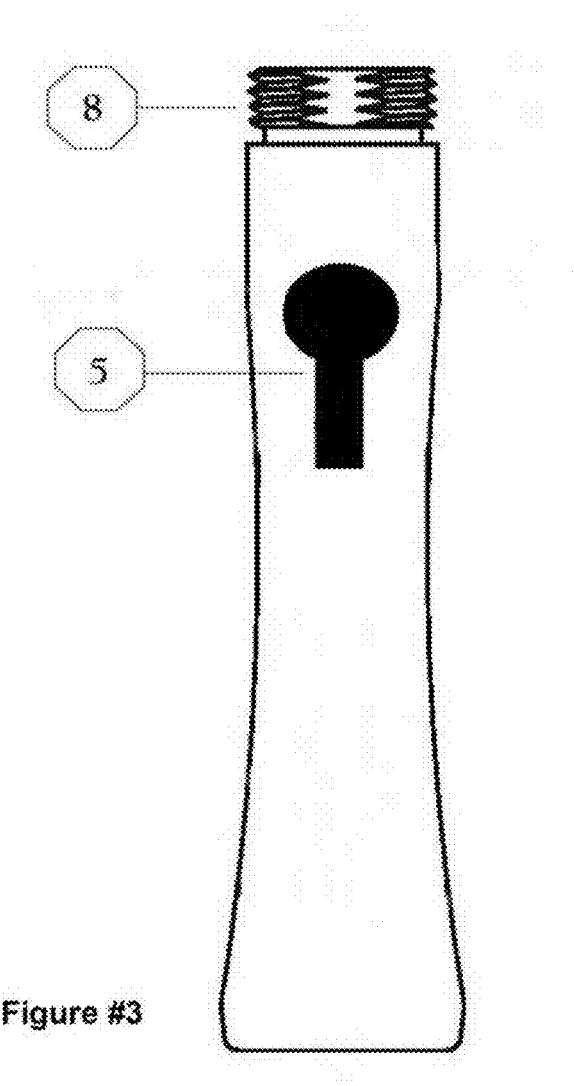
Figure #3

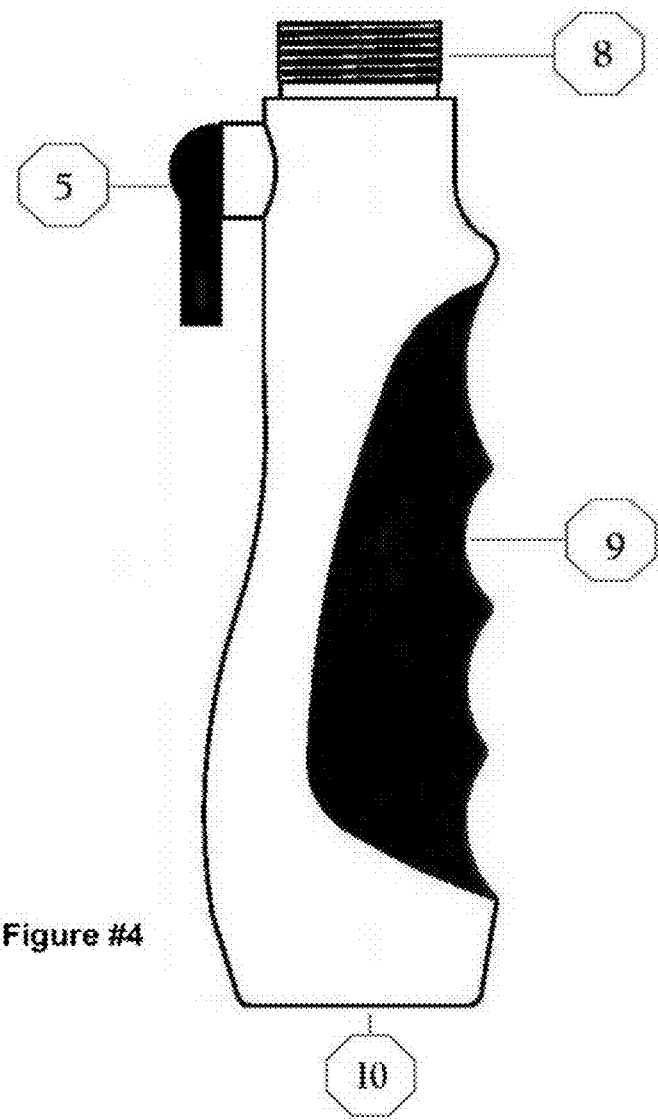
Figure #4

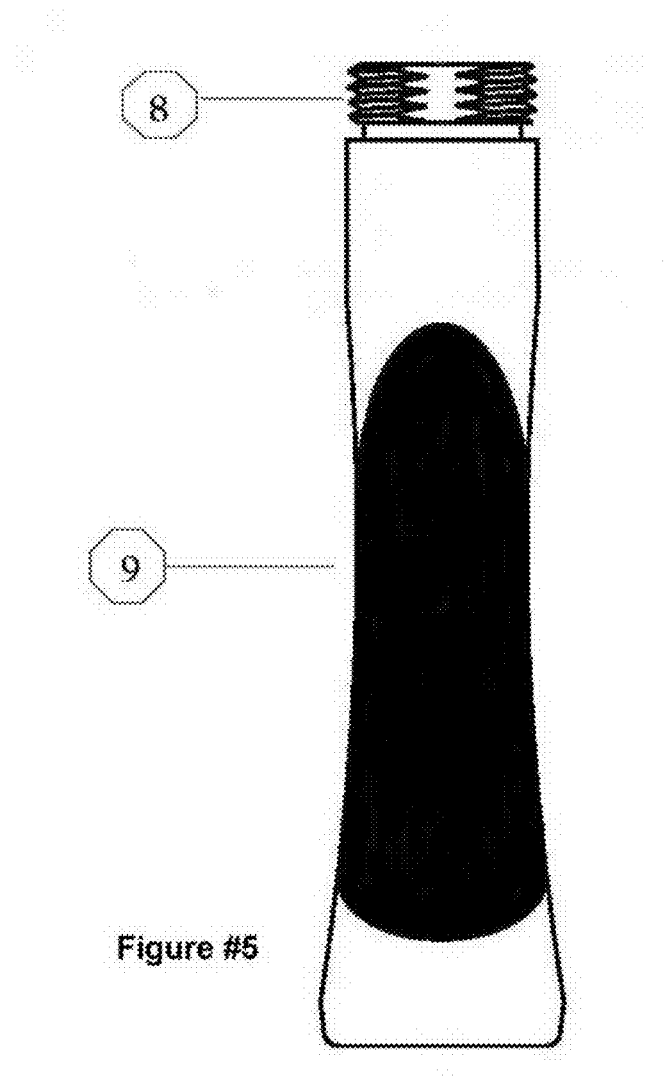
Figure #5

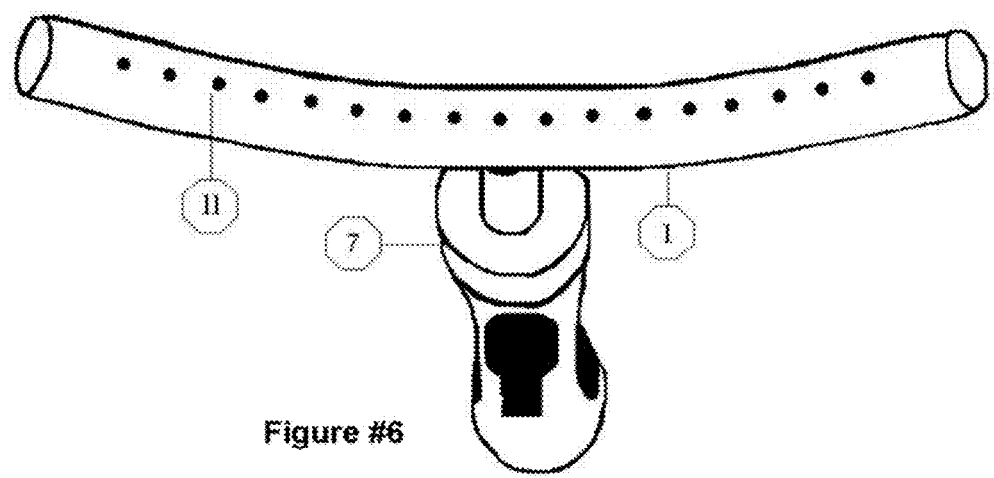
Figure #6
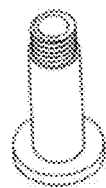
Figure #7
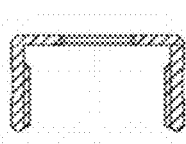
Figure #8
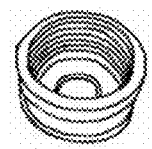
Figure #9

FILTER FLOSSER

CROSS REFERENCE TO RELATED APPLICATION

This application claims benefit of U.S. Provisional Patent Application No. 61/088,787 filed Aug. 14, 2008 which is incorporated by reference herein.

FIELD OF INVENTION

The invention relates generally to cleaning tools used for cleaning cartridge filters found in pools, spas and industrial filtration systems.

BACKGROUND OF INVENTION

There are three types of water filtration systems for pools and spas including sand filters, diatomaceous earth and cartridge filters. Of the three type systems cartridge filters work efficiently through what is known as a "clarification" process in which they utilize the debris they collect as an aid to improve filtration. As a result, cleaning too often does not allow the filter to work at optimum filtration efficiency, while not cleaning often enough will shorten the life of a cartridge element so they require a maintenance schedule as per OEM requirements to keep up to peak efficiency. OEM's do not recommend the use of pressure washers for the cleaning of cartridge filters since the high pressure damages the filter material and shortens the life of the filter.

All three filtration systems require regular maintenance to clean the filtration device. Two of the three systems; diatomaceous earth and cartridge filters are usually cleaned via the use of garden hose with garden hose nozzle. One system; sand filters back wash water reversely through the system into the yards or proper sewage return line to remove debris in which it wastes a large amount of water during this process.

Apparatuses for cleaning filters are also known to the art. For example, Swedish Patent Specification No. 117.537 discloses a filter-cleaning means which is combined with the normal usage site of the filter. In addition to this older filter-cleaning means being mechanically complicated, its practical use would also seem to be complicated. It is also stationary, which may present a problem.

The U.S. Pat. No. 3,620,234 describes a complicated, stationary apparatus for cleaning air filters, while U.S. Pat. No. 3,568,414 describes an apparatus for cleaning fluid filters. A method of cleaning square filters is taught in U.S. Pat. No. 4,049,555. A common disadvantage with these known filter-cleaners is their complex construction, which renders them expensive. Another disadvantage is the number of complicated procedural steps which must be undertaken before a filter operation can commence.

Consequently, the object of the present invention is to provide a portable filter-cleaning apparatus which is both inexpensive and of simple design and with which the filter cartridges of a filter unit can be thoroughly cleaned.

SUMMARY

A cartridge filter cleaning tool comprised of: (a) a handle portion; (b) with a ball valve on/off switch; and (c) a curved nozzle portion for even dispersion of water.

The handle recited in 1(a) is 100% dye cast aluminum and is chrome plated.

The handle recited in 1(a) is threaded at both ends; one end to receive a standard garden hose and the other end to receive the nozzle portion of the unit.

The handle recited in 1(a) has an ergonomically designed grip with rubber coating for easy grip.

The ball valve recited in 1(b) is ½" a ball valve made from composite plastic and is used to turn on/off water flow.

The nozzle recited in 1(c) is a curved piece of ⅝" 120 mil aluminum tubing and has a curve radius of an 8½" circle which enables the nozzle to curve partially around a cartridge filter.

The nozzle recited in 1(c) has seventeen 1/16" holes drilled from end to end at ⅜" apart for even dispersion of water for cleaning in between pleats.

The nozzle recited in 1(c) is electroplated.

DESCRIPTION OF DRAWINGS

FIG. 1 is a top view of an embodiment of the components of the Filter Flosser in accordance with the present disclosure.

FIG. 2 is a top view of a nozzle component of the Filter Flosser in accordance with the present disclosure.

FIG. 3 is a top view of a handle component of the Filter Flosser in accordance with the present disclosure.

FIG. 4 is a side view of the handle component of the Filter Flosser in accordance with the present disclosure.

FIG. 5 is a back view of the handle component of the Filter Flosser in accordance with the present disclosure.

FIG. 6 is a perspective view of an embodiment of the components of the Filter Flosser in accordance with the present disclosure.

FIG. 7 is a perspective view of a stem portion of the nozzle component of the Filter Flosser in accordance with the present disclosure.

FIG. 8 is a cross-sectional view of a hose bib connection of the nozzle component of the Filter Flosser in accordance with the present disclosure.

FIG. 9 is a rear perspective view of the hose bib connection of the nozzle component of the Filter Flosser in accordance with the present disclosure.

DETAILED DESCRIPTION OF EMBODIMENTS

FIG. 1.0 is showing a complete drawing of the unit showing all components.

FIG. 1.1, or reference character 1 on FIG. 1, is showing the curved nozzle portion of the unit.

FIG. 1.2, or reference character 2 on FIG. 1, is showing the stem portion of the unit.

FIG. 1.3, or reference character 3 on FIG. 1, is showing the engraved Filter Flosser portion of the nozzle unit.

FIG. 1.4, or reference character 4 on FIG. 1, is showing the knurling of the hose bib connection.

FIG. 1.7, or reference character 7 on FIG. 1, is showing the hose bib connection from the nozzle to the handle portion.

FIG. 1.5, or reference character 5 on FIG. 1, is showing the on/off ball valve of the handle.

FIG. 1.6, or reference character 6 on FIG. 1, is showing the handle portion of the unit.

FIG. 2.0 is showing the completed nozzle with stem and hose bib connections.

FIG. 3.0 is showing a front view of the handle portion of the unit.

FIG. 3.8, or reference character 8 on FIG. 3, is showing the thread portion of the handle that receives the nozzle.

FIG. 4.0 is showing a side view of the handle portion of the unit.

FIG. 4.9, or reference character 9 on FIG. 4, is showing the rubber grip of the handle portion of the unit.

FIG. 4.10, or reference character 10 on FIG. 4, is showing the hose connection for the unit.

FIG. 5.0 is showing the back view of the handle portion of the unit.

FIG. 6.0 is showing the drilled holes in the nozzle portion of the unit.

FIG. 7.0 is showing the stem portion on the nozzle unit.

FIG. 8.0 is showing a cut away side view of the hose bib connection of the nozzle.

FIG. 9.0 is showing a reverse image of the hose bib connection of the nozzle.

Since all pools & spas require chemicals for proper water balance and water filtration to remove debris & body oils for proper maintenance and cleanliness, Filter Flosser is the ideal tool for cleaning the cartridge filters in cartridge filter filtration type systems.

Since all above hot tubs utilize cartridge filters and a growing number (approximately 80%) of all new pools are now installing cartridge filters this invention was inspired as a tool that provides a better way to clean cartridge filters which reduces the time it takes to clean the cartridges, is less messy as it eliminates back splash, since the person practicing this method is exposed to a lot of water, he or she must either wear waterproof clothing or a bathing costume. Filter Flosser reduces water usage by 50% or better making it more eco friendly than using a regular garden hose alone which was the previous option for cleaning cartridge filters of this type.

Filter Flosser is an inexpensive effective cartridge filter cleaning tool for the pool & spa industry. It does not damage the cartridge as compared to other products on the market. It provides a more durable design with 50% better performance, reducing cleaning time needed and reduces the environmental impact by reducing water usage by 50%.

The handle portion of the product process consists of Aluminum die-casting, nickel-plated, and covered with PVC or PVE on for the grip.

The nozzle portion of the product process consists of extruded tube aluminum which is bent, drilled or mandrel punched, notched cut and welded.

The final process joins both parts together via a standard hose bib connection.

The nozzle is tested for 65 psi water pressure at 10 gpm water flow from a standard hose bib.

The hole pattern on the curved nozzle may have a total of 15 holes with 7 holes on either side of the center hole. The individual holes may be spaced ⅜" apart from one another.

Filter Flosser is a tool designed for cleaning cartridge filters that are used in pools, spas and industrial filtration systems.

There is an ergonomically designed handle with an on/off ball valve switch to turn water flow on or off. There is a nozzle portion that is curved to wrap partially around the shape of a cartridge filter. There are holes in the nozzle portion which are evenly spaced that spray water into the cartridge filter elements to get between the pleats and remove dirt deposits.

What is claimed is:

1. A cleaning tool configured to clean a cartridge filter, the tool comprising:
    a stem having a first end and a second end;
    a hose bib connection coupled to the first end;
    a nozzle portion coupled to the second end, the nozzle portion having a segmentally arc circular shape, the segmentally arc circular shape having fluidicly sealed opposing distal ends; and
    a plurality of apertures configured in the segmentally arc circular shape between the opposing distal ends, the plurality of apertures opposing the stem portion.

2. The tool of claim 1, wherein the nozzle portion is fixedly coupled to the second end.

3. The tool of claim 1, wherein the hose bib connection is threaded to receive a pressurized fluid source.

4. The tool of claim 1, wherein the hose bib connection is threaded to receive a handle thereon, the handle being configured to receive a pressurized fluid source.

5. The tool of claim 4, wherein the handle further comprises a ball valve on/off switch.

6. The tool of claim 1, wherein the stem and the nozzle portion are hollow to allow a fluid to flow there through under the condition a pressurized fluid source is coupled to the hose bib connection.

7. The tool of claim 1, wherein the segmentally arc circular shape arches away from the stem such that the plurality of apertures focus a flow of pressurized fluid to a converged point within the curve radius of the segmentally arc circular shape.

8. The tool of claim 1, wherein the plurality of apertures are aligned along a single line.

9. The tool of claim 1, wherein the plurality of apertures are drilled into the segmentally arc circular shape.

10. The tool of claim 1, wherein each of the plurality of apertures is spaced apart a first distance from one another.

11. The tool of claim 10, wherein the plurality of apertures further comprise opposing end apertures, each of the opposing end apertures being spaced away from the opposing distal ends of the segmentally arc circular shape a second distance greater than the first distance.

12. The cleaning tool of claim 1, wherein a cross-section of the segmentally arc circular shape is circular along a length of the segmentally arc circular shape between opposing distal ends.

13. The cleaning tool of claim 1, wherein the apertures are configured on an interior of the segmentally arc circular shape of the nozzle portion.

14. A cleaning tool configured to clean a cartridge filter, the tool comprising:
    a segmentally arc circular shape nozzle portion, the nozzle portion being closed off at opposing distal ends thereof;
    a plurality of apertures configured along an interior of the segmentally arc circular shape of the nozzle portion between the opposing distal ends;
    a stem portion coupled to and extending from an exterior of the segmentally arc circular shape of the nozzle portion; and
    a hose bib connection coupled to the stem portion and configured to receive a pressurized fluid source.

15. The tool of claim 14, wherein the pressurized fluid source is a garden hose.

* * * * *